United States Patent
Krovvidi

(10) Patent No.: US 12,167,308 B2
(45) Date of Patent: Dec. 10, 2024

(54) APPARATUS, SYSTEM AND METHOD OF COMMUNICATING AUDIO TRAFFIC OVER A BLUETOOTH LINK

(71) Applicant: INTEL CORPORATION, Santa Clara, CA (US)

(72) Inventor: Srinivas Krovvidi, Telengana (IN)

(73) Assignee: INTEL CORPORATION, Santa Clara, CA (US)

( * ) Notice: Subject to any disclaimer, the term of this patent is extended or adjusted under 35 U.S.C. 154(b) by 837 days.

(21) Appl. No.: 17/132,130

(22) Filed: Dec. 23, 2020

(65) Prior Publication Data

US 2021/0168578 A1    Jun. 3, 2021

(51) Int. Cl.
- *H04W 4/80* (2018.01)
- *G10L 17/24* (2013.01)
- *G10L 25/78* (2013.01)
- *H04W 72/0446* (2023.01)

(52) U.S. Cl.
CPC .............. *H04W 4/80* (2018.02); *G10L 17/24* (2013.01); *G10L 25/78* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 8,468,023 B1 * | 6/2013 | Stracke, Jr. | ......... | H04M 1/6066 704/275 |
| 8,792,876 B1 * | 7/2014 | Zhu | ..................... | H04L 12/4641 370/338 |
| 10,827,271 B1 * | 11/2020 | Renna | ..................... | H04R 5/033 |
| 11,175,880 B2 * | 11/2021 | Liu | ......................... | G06F 3/165 |
| 2006/0019677 A1 * | 1/2006 | Teague | .................. | H04L 47/788 455/456.3 |
| 2009/0017879 A1 * | 1/2009 | Tsfaty | ..................... | H04B 1/46 455/574 |
| 2009/0147756 A1 * | 6/2009 | Yang | ..................... | H04B 1/713 370/336 |
| 2011/0019552 A1 * | 1/2011 | Karaoguz | ............. | H04L 45/124 370/236 |
| 2014/0162555 A1 * | 6/2014 | Wernaers | ................ | H04W 4/80 455/41.2 |

(Continued)

OTHER PUBLICATIONS

Bluetooth Core Specification V 5.0, Dec. 6, 2016, 2822 pages.

*Primary Examiner* — Gennadiy Tsvey
(74) *Attorney, Agent, or Firm* — Shichrur & Co.

(57) ABSTRACT

For example, a BT audio device may be configured to, during a passphrase-detection mode, monitor an audio input of the BT audio device to detect whether the audio input includes a voice signal, the passphrase-detection mode configured for detection of a predefined user passphrase to indicate a voice command to be provided from a user of the BT audio device; based on a determination that the audio input does not include the voice signal, transmit one or more null-data packets to a BT device over a BT wireless communication link between the BT audio device and the BT device; and, based on a determination that the audio input includes the voice signal, transmit one or more data packets to the BT device over the BT wireless communication link, wherein a payload of the one or more data packets includes audio data based on the audio input.

17 Claims, 5 Drawing Sheets

(56) References Cited

U.S. PATENT DOCUMENTS

| | | | |
|---|---|---|---|
| 2015/0201446 A1* | 7/2015 | Linsky | H04W 76/15 |
| | | | 370/329 |
| 2016/0155443 A1* | 6/2016 | Khan | G06F 3/167 |
| | | | 704/275 |
| 2018/0053284 A1* | 2/2018 | Rodriguez | G06T 5/80 |
| 2018/0054780 A1* | 2/2018 | Radulescu | H04W 68/005 |
| 2018/0286414 A1* | 10/2018 | Ravindran | G10L 15/08 |
| 2020/0042350 A1* | 2/2020 | Deval | G06F 9/45558 |
| 2020/0146097 A1* | 5/2020 | Haartsen | H04M 1/6066 |
| 2020/0311018 A1* | 10/2020 | Singh | G06F 1/3253 |
| 2020/0336846 A1* | 10/2020 | Rohde | H04R 25/552 |
| 2021/0319782 A1* | 10/2021 | Gong | G10L 15/08 |

\* cited by examiner

APPARATUS, SYSTEM AND METHOD OF COMMUNICATING AUDIO TRAFFIC OVER A BLUETOOTH LINK

TECHNICAL FIELD

Aspects described herein generally relate to communicating audio traffic over a Bluetooth link.

BACKGROUND

A Bluetooth audio device, e.g., a headset, a wireless earphone, or a car speaker, may be connected and/or paired with a Bluetooth device, e.g., a Smartphone, or a computing device, for example, to transfer audio between the Bluetooth audio device and the Bluetooth device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
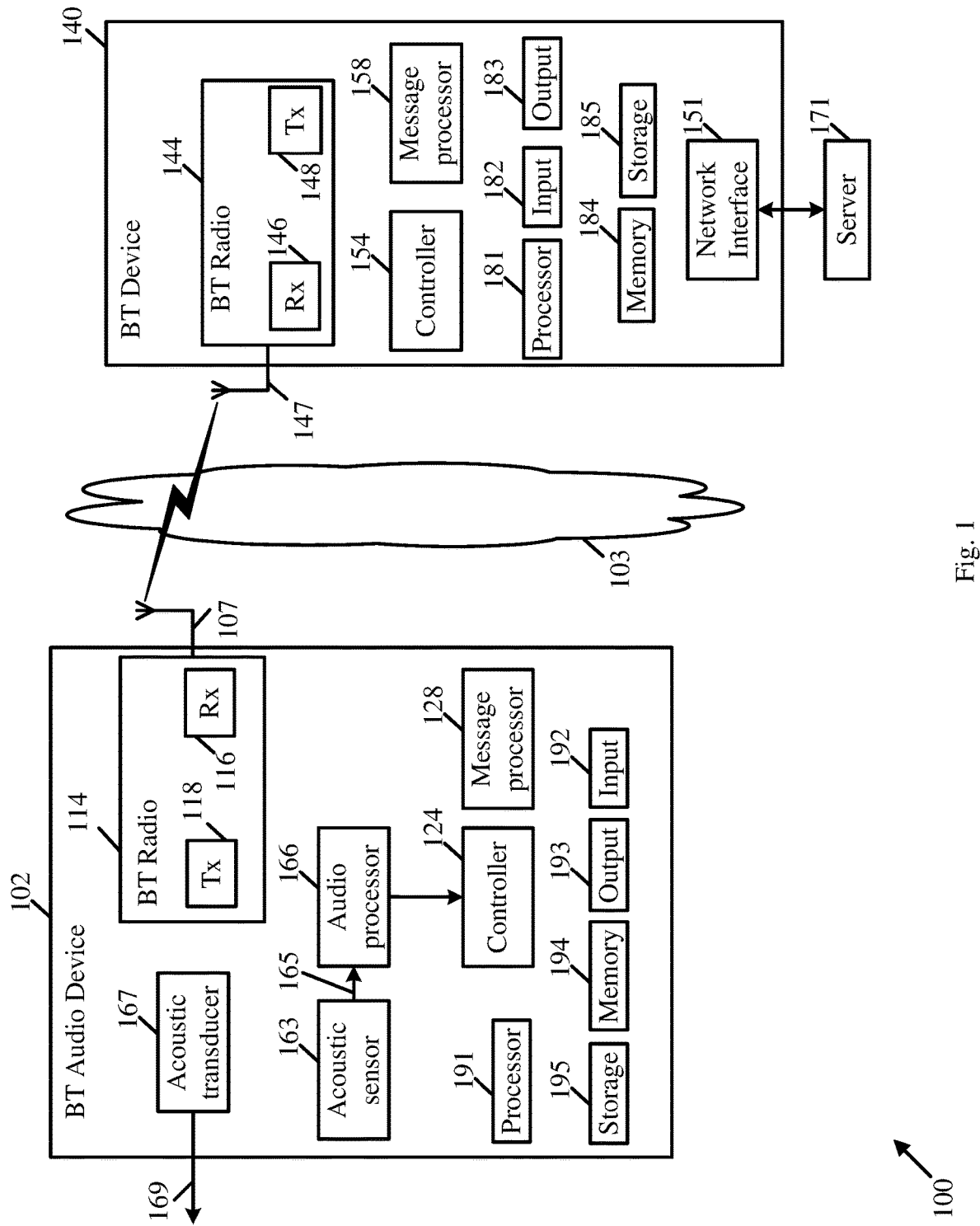
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio-video (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including Bluetooth Core Specification V 5.0, Dec. 6, 2016, and/or future versions and/or derivatives thereof, devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102 and/or 140.

In some demonstrative aspects, devices 102 and/or 140 may include, operate as, and/or perform the functionality of one or more BT devices.

In some demonstrative aspects, device 102 may include a BT mobile device, and/or device 140 may include a BT mobile device. In other aspects, device 102 and/or device 140 may include a non-mobile BT device.

In one example, devices 102 and/or 140 may include BT Low Energy (LE) (BLE) compatible devices. In other aspects, devices 102 and/or 140 may include or implement any other additional or alternative BT communication functionality, e.g., according to any other additional or alternative BT protocol.

In some demonstrative aspects, device 102 may include, operate as, and/or perform the functionality of, a BT audio device. For example, the BT audio device may include a BT headset, a BT headphone, a BT earphone, a BT hands-free device, a voice-controlled device, a smart speaker device, a sensor device, a BT A/V device, a device incorporating a BT audio device, and/or any other audio device, which may be configured to communicate audio traffic with BT device 140, e.g., as described below.

In some demonstrative aspects, device 102 may include at least one acoustic sensor 163 to generate an audio input 165, for example, based on acoustic energy sensed by acoustic sensor 163, e.g., from an environment of BT audio device 102. For example, acoustic sensor 163 may include a microphone. In other aspects, acoustic sensor 163 may include any other sensor configured to sense sound in an environment of device 102, e.g., accelerometers, tachometers, or the like.

In some demonstrative aspects, device 102 may include at least one acoustic transducer 167 to generate an acoustic output 169 to be heard by a user of device 102. For example, acoustic transducer 169 may include a speaker. In other aspects, acoustic sensor may include any other acoustic actuator to generate the acoustic output 169.

In some demonstrative aspects, device 140 may include, for example, a UE, an MD, a STA, a PC, a desktop computer, a mobile computer, a laptop computer, an Ultrabook™ computer, a notebook computer, a tablet computer, a server computer, a handheld computer, a Smartphone, a mobile phone, a cellular telephone, an Internet of Things (IoT) device, a sensor device, a handheld device, a wearable device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a video device, an audio device, an A/V device, a media player, a television, a music player, or the like.

In some demonstrative aspects, devices 102 and/or 140 may include, operate as, and/or perform the functionality of one or more STAs. For example, device 102 may include at least one STA, and/or device 140 may include at least one STA.

In some demonstrative aspects, devices 102 and/or 140 may include, operate as, and/or perform the functionality of one or more WLAN STAs.

In some demonstrative aspects, devices 102 and/or 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102 and/or 140 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of device 102 and/or device 140 may be enclosed in a common housing or packaging, and may be interconnected or operably associated using one or more wired or wireless links. In other aspects, components of device 102 and/or device 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102 and/or 140 may include one or more BT radios including circuitry and/or logic to perform wireless communication between devices 102, 140 and/or one or more other BT devices. For example, device 102 may include at least one BT radio 114, and/or device 140 may include at least one BT radio 144.

In some demonstrative aspects, devices 102 and/or 140 may include one or more other radios, e.g., a WiFi radio, an OFDM radio, a cellular radio, and/or the like.

In some demonstrative aspects, BT radio 114 and/or BT radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, BT radio 114 and/or BT radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, BT radio 114, BT radio 144, transmitter 118, transmitter 148, receiver 116, and/or receiver 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 and/or BT radio 144 may be configured to communicate over a 2.4 GHz band, and/or any other band.

In some demonstrative aspects, BT radio 114 and/or BT radio 144 may include, or may be associated with, one or more antennas. For example, BT radio 114 may include, or may be associated with, one or more antennas 107; and/or BT radio 144 may include, or may be associated with, one or more antennas 147.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative aspects, controller 124 and/or controller 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT audio device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a BT device, e.g., device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of BT radio 114. For example, the chip or SoC may include one or more elements of controller 124, one or more elements of message processor 128, and/or one or more elements of BT radio 114. In one example, controller 124, message processor 128, and BT radio 114 may be implemented as part of the chip or SoC.

In other aspects, controller 124, message processor 128 and/or BT radio 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of BT radio 144. For example, the chip or SoC may include one or more elements of controller 154, one or more elements of message processor 158, and/or one or more elements of BT radio 144. In one example, controller 154, message processor 158, and BT radio 144 may be implemented as part of the chip or SoC.

In some demonstrative aspects, devices 102 and/or 140 may be configured to support detection and communication of a voice command from a user of devices 102 and/or 140, e.g., as described below.

In some demonstrative aspects, devices 102 and/or 140 may be configured to operate at a passphrase detection mode to detect a passphrase ("user passphrase") from a user of devices 102 and/or 140.

In some demonstrative aspects, the passphrase detection mode may be configured for detection of a predefined user passphrase to indicate a forthcoming voice command to be provided from a user of the BT audio device 102.

In some demonstrative aspects, the user passphrase may include any suitable passphrase, which may be utilized by the user of devices 102 and/or 140 to indicate the forthcoming voice command from the user of devices 102 and/or 140.

In one example, the user passphrase may include a unique and/or personal passphrase, which may be configured by the user of devices 102 and/or 140, and/or which may uniquely identify the user of devices 102 and/or 140.

In another example, the user passphrase may include a general and/or preset passphrase, e.g., which may be configured and/or preset by a suitable service and/or application.

In other aspects, any other passphrase configuration may be utilized.

In some demonstrative aspects, devices 102 and/or 140 may be configured to operate at a voice command detection mode to detect a voice command from the user of devices 102 and/or 140.

In some demonstrative aspects, devices 102 and/or 140 may be configured to switch from the passphrase detection mode to the voice command detection mode, for example, based on detection of the user passphrase.

In some demonstrative aspects, devices 102 and/or 140 may be configured to support execution of an operation based on the voice command, for example, locally, e.g., by device 140, and/or remotely, for example, by a server 171.

In some demonstrative aspects, device 140 may include a network interface 151 configured to communicate with server 171, for example, via a wired network connection and/or a wireless network connection, e.g., an Internet connection, or the like.

In some demonstrative aspects, the voice command may include a voice command for a voice-controlled intelligent personal assistant application and/or service.

In one example, the voice-controlled intelligent personal assistant application and/or service may include a local voice-controlled intelligent personal assistant application and/or service, which may be executed locally on device 140.

In one example, the voice-controlled intelligent personal assistant application and/or service may include a remote voice-controlled intelligent personal assistant application and/or service, which may be executed by server 171.

In some demonstrative aspects, the voice command may include a voice command for triggering one or more operations to be performed by device 140, an application, and/or a service.

In some demonstrative aspects, execution of the operation based on the voice command may be performed remotely, for example, by server 171. For example, the voice command may include a request for information to be provided by server 171, and/or any other operation to be performed by server 171, e.g., for the user of devices 102 and/or 140, and/or on behalf of the user of devices 102 and/or 140.

In one example, the voice command may include a voice command to a virtual assistant application or service, and the execution of the operation based on the voice command may include execution of an operation by the virtual assistant application or service.

In some demonstrative aspects, execution of the operation based on the voice command may be performed locally, for example, by device 140.

For example, the operation based on the voice command may include turning on device 140, turning off device 140, controlling one or more functionalities of device 140, causing device 140 to provide an output to the user of devices 102 and/or 140, e.g., play a song or a multimedia file, and/or any other operation which may be locally executed by device 140.

In one example, the voice command may be a command for starting, ending, and or controlling a voice call, e.g., a telephone call or a video call, to be performed via devices 102 and 140.

In another example, the voice command may be a command for starting, ending, and or controlling audio streaming of audio from BT device 140 to be output by BT audio device 102.

In another example, device 140 may be implemented as part of a vehicular system of a vehicle. According to this example, the voice command may be a command for triggering one or more operations and/or functionalities of the vehicle.

In some demonstrative aspects, for example, controller 124 may be configured to trigger, cause, and/or control one or more operations and/or functionalities of device 102 at the passphrase detection mode and/or at the voice command detection mode, e.g., as described below.

In some demonstrative aspects, for example, controller 154 may be configured to trigger, cause, and/or control one or more operations and/or functionalities of device 140 at the passphrase detection mode and/or at the voice command detection mode, e.g., as described below.

In some demonstrative aspects, the passphrase detection mode may be configured to allow devices 102 and/or 140 to operate at a reduced power mode and/or to perform one or more other operations and/or functionalities, for example, until the voice command is to be received, processed, and/or communicated.

In some demonstrative aspects, the user passphrase may be utilized as a trigger to detect and/or record the voice command from the user of devices 102 and/or 140.

In some demonstrative aspects, detection of the user passphrase may indicate that a voice command is expected to follow from the user of devices 102 and/or 140.

In some demonstrative aspects, based on detection of the user passphrase, devices 102 and/or 140 may be operated to record, detect, process and/or communicate the voice command from the user of devices 102 and/or 140.

In some demonstrative aspects, device 102 may be operated to transfer to device 140 BT packets including an audio payload based on the audio input 165 of BT audio device 102, for example, at the voice command detection mode. This audio payload may be expected to include the voice command from the user of devices 102 and/or 140.

In some demonstrative aspects, device 140 may be configured, for example, to transfer to server 171 a recorded voice command, which is based on the audio payload from device 102.

In some demonstrative aspects, the server 171 may be configured to process the recorded voice command from device 140, for example, to identify and/or interpret the voice command from the user of devices 102 and/or 140. For example, server 171 may send back information to device 140 and/or trigger an operation by device 140, for example, based on the voice command from the user of devices 102 and/or 140.

Figure 2:
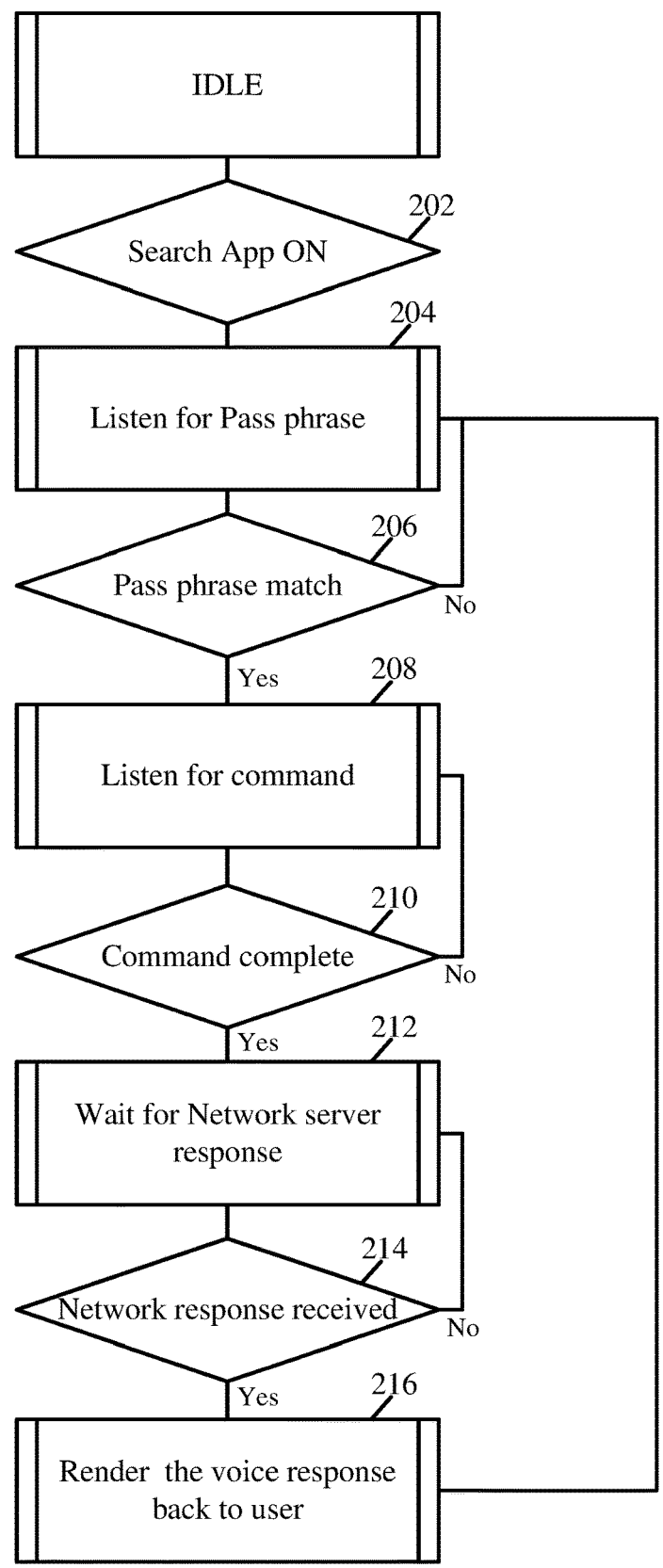
FIG. 2 is a schematic flow-chart illustration of a method of detecting a voice command, which may be implemented in accordance with some demonstrative aspects.

Reference is made to FIG. 2, which illustrates of a method of detecting a voice command, which may be implemented in accordance with some demonstrative aspects. For example, one or more operations of the method of FIG. 2 may be performed by a BT audio device, e.g., BT audio device 102 (FIG. 1), and/or a BT device, e.g., BT device 140 (FIG. 1).

In some demonstrative aspects, as indicated at block 202, the method may include activating a voice command detection mechanism. For example, the voice command detection mechanism may be activated by an application and/or service, which may be executed by a BT device, e.g., BT device 140 (FIG. 1). In one example, a user of BT device 140 (FIG. 1) may activate an application or service, e.g., a virtual assistant application or service, and/or any other application and/or functionality supporting voice commands.

In some demonstrative aspects, as indicated at block 204, the method may include operating at a passphrase detection mode to detect a user passphrase from a user. For example, controller 102 (FIG. 1) may control BT audio device 102 (FIG. 1) and/or controller 154 (FIG. 1) may control BT device 140 (FIG. 1) to operate at the passphrase detection mode.

In some demonstrative aspects, as indicated at block 206, the method may include determining whether a passphrase match is detected, for example, based on a match between audio received from the user and a predefined user passphrase. For example, the passphrase match may be detected, for example, based on a match between audio input 165 (FIG. 1) and the predefined user passphrase.

In some demonstrative aspects, as indicated at block 208, the method may include switching, based on detection of the passphrase match, from the passphrase detection mode to a voice command detection mode for listening to a voice command from the user. For example, controller 102 (FIG. 1) may control BT audio device 102 (FIG. 1) and/or controller 154 (FIG. 1) may control BT device 140 (FIG. 1) to switch to operate at the voice command detection mode, for example, based on detection of the passphrase match.

In some demonstrative aspects, as indicated at block 210, the method may include waiting to complete receipt of the voice command from the user.

In some demonstrative aspects, as indicated at block 212, the method may include transferring the voice command to a server. For example, controller 102 (FIG. 1) may control BT audio device 102 (FIG. 1) to transmit to BT device 140 (FIG. 1) BT packets including an audio payload based on the audio input 165 (FIG. 1) of device 102 (FIG. 1); and/or controller 154 (FIG. 1) may control BT device 140 (FIG. 1) to transfer the audio payload to server 171 (FIG. 1), e.g., via network interface 151 (FIG. 1).

In some demonstrative aspects, as indicated at block 214, the method may include waiting to receive from the server a response to the voice command.

In some demonstrative aspects, as indicated at block 216, the method may include executing one or more operations based on the response to the voice command from the server. For example, the one or more operations may include rendering a voice response to the user. In one example, controller 154 (FIG. 1) may control BT device 140 (FIG. 1) to transmit to BT audio device 102 (FIG. 1) BT packets including an audio payload based on a response from the server; and/or controller 124 (FIG. 1) may control BT audio device 102 (FIG. 1) to generate audio output 169 (FIG. 1) based on the audio payload from BT device 140 (FIG. 1).

Referring back to FIG. 1, there may be a need to address one or more technical issues for efficiently and/or accurately detecting the user passphrase, e.g., at the passphrase detection mode, e.g., as described below.

In some demonstrative aspects, in some use cases, scenarios, and/or implementations, there may be one or more technical problems to maintain a BT low-latency link configuration, e.g., a BT synchronous link configuration, between BT audio device 102 and BT device 140, for example, during an entire duration of the passphrase detection mode.

For example, maintaining a BT low-latency link configuration, e.g., a BT synchronous link configuration, between BT audio device 102 and BT device 140, may allow to transfer the audio input 165 from audio BT device to BT device 140, for example, with low latency. Accordingly, the audio input 165 may be processed for detecting the user passphrase with low latency, e.g., at BT device 140. However, maintaining the BT low-latency link configuration between BT audio device 102 and BT device 140 during the entire duration of the passphrase detection mode may consume a large amount of power, e.g., from device 102 and/or device 140. For example, in some cases, maintaining the BT low-latency link configuration between BT audio device 102 and BT device 140 may result in draining of a power source of devices 102 and/or 140, e.g., even before the passphrase is detected.

In some demonstrative aspects, devices 102 and/or 140 may be configured to implement a communication scheme, which may be configured to provide a technical solution of reduced power consumption during the passphrase detection mode, e.g., as described below.

In some demonstrative aspects, a technical solution for efficient operation during the passphrase detection mode may be based on a characterization of the passphrase detection mode as a simplex voice communication use case, which may include communication of audio in one direction over a BT wireless communication link, e.g., from BT audio device 102 to BT device 140. For example, during the passphrase detection mode the BT audio device 102 may be expected to transmit audio information to BT device 140 over the BT wireless communication link, for example, while BT device 140 may wait to receive the audio information from BT audio device 102. In one example, the BT device 140 may transmit to BT audio device 140 one or more packets over the BT wireless communication link, e.g., poll packets, null-data packets, keep-alive packets, and/or any other packets, for example, in order to maintain the BT communication link between BT audio device 102 and BT device 140 active ("alive").

In some demonstrative aspects, controller 124 may be configured to cause, trigger, and/or control BT audio device 102 to detect whether audio input 165 of the BT audio device 102 includes a voice signal, and to selectively transmit an audio payload corresponding to the audio input 165 over the BT wireless communication link, for example, based on whether or not the audio input 165 of the BT audio device 102 includes a voice signal, e.g., as described below.

In some demonstrative aspects, controller 124 may be configured to cause, trigger, and/or control BT audio device 102 to selectively transmit an audio payload over the BT wireless communication link, for example, by selecting to transmit the audio payload over the BT wireless communication link, for example, when it is determined that the audio input 165 of the BT audio device 102 includes a voice signal, e.g., as described below.

In some demonstrative aspects, controller 124 may be configured to cause, trigger, and/or control BT audio device 102 to selectively transmit an audio payload over the BT wireless communication link, for example, by selecting not to transmit the audio payload over the BT wireless communication link, for example, when it is determined that the audio input 165 of the BT audio device 102 does not include a voice signal, e.g., as described below.

In some demonstrative aspects, controller 124 may be configured to cause, trigger, and/or control BT audio device 102 to transmit to BT device 140 one or more null-data packets over the BT wireless communication link, for example, when it is determined that the audio input 165 of the BT audio device 102 does not include a voice signal, e.g., as described below.

In some demonstrative aspects, transmission of the one or more null-data packets over the BT wireless communication link may be configured, for example, to maintain the BT communication link between BT audio device 102 and BT device 140 active ("alive").

In some demonstrative aspects, the null-data packets may include any type of packets, which do not include an audio payload, e.g., a data payload.

In some demonstrative aspects, controller 124 may be configured to cause, trigger, and/or control BT audio device 102 to detect that the audio input 165 of the BT audio device 102 includes silence and/or white noise, and/or any other noise or sound, which may be different from a voice signal.

In some demonstrative aspects, controller 124 may be configured to cause, trigger, and/or control BT audio device 102 to avoid sending data packets over the BT wireless communication link, for example, based on the detection that the audio input 165 of the BT audio device 102 includes silence and/or white noise, and/or any other noise or sound, which may be different from a voice signal.

In some demonstrative aspects, controller 124 may be configured to cause, trigger, and/or control BT audio device 102 to send one or more null-data packets, e.g., null PPDUs, over the BT wireless communication link, for example, based on the detection that the audio input 165 of the BT audio device 102 includes silence and/or white noise, and/or any other noise or sound, which may be different from a voice signal.

In some demonstrative aspects, the ability to selectively avoid the transmission of the audio packets over the BT wireless communication channel, e.g., based on the detection that the audio input 165 of the BT audio device 102 does not include a voice signal, may provide a technical advantage of saving power, e.g., at device 102 and/or device 140.

In some demonstrative aspects, device 102 and/or device 140 may be configured to utilize a first link configuration of the BT wireless communication link, e.g., a link configuration supporting a first latency, for example, during the passphrase detection mode.

In some demonstrative aspects, controller 124 may be configured to cause, trigger, and/or control BT audio device 102 to configure the BT wireless link between BT audio device 102 and BT device 140 according to the first link configuration to support the first latency during the passphrase detection mode.

In some demonstrative aspects, the first link configuration may support a relatively "relaxed" latency, e.g., a latency which may support power saving at device 102 and/or device 140, for example, while keeping a tolerable latency for passphrase detection.

In some demonstrative aspects, the first link configuration may support latency between 50 milliseconds (msec) and 100 msec. In other aspects, the first link configuration may support latency greater than 100 msec, e.g., a few hundred msec. In other aspects, any other latency may be implemented.

In some demonstrative aspects, device 102 and/or device 140 may be configured to utilize the first link configuration of the BT wireless communication link, for example, by configuring the BT wireless communication link as an isochronous link, e.g., a BT Connected Isochronous link, during the passphrase detection mode. In other aspects, any other link configuration may be used.

In some demonstrative aspects, controller 124 may be configured to cause, trigger, and/or control BT audio device 102 to configure the BT wireless link between BT audio device 102 and BT device 140 as a simplex link, for example, according to a BT Low Energy Audio (BT LE Audio) configuration, or any other configuration. For example, controller 124 may be configured to cause, trigger, and/or control BT audio device 102 to configure the BT wireless link as the simplex link for communication with BT device during the passphrase detection mode.

In some demonstrative aspects, device 102 and/or device 140 may be configured to utilize a second link configuration of the BT wireless communication link, e.g., a link configuration supporting a second latency, for example, during the voice command detection mode.

In some demonstrative aspects, controller 124 may be configured to cause, trigger, and/or control BT audio device 102 to configure the BT wireless link between BT audio device 102 and BT device 140 according to the second link configuration to support the second latency during the voice command detection mode.

In some demonstrative aspects, controller 124 may be configured to cause, trigger, and/or control BT audio device 102 to reconfigure the BT wireless link between BT audio device 102 and BT device 140 from the first link configuration to the second link configuration, for example, based on a determination that the passphrase has been detected.

In some demonstrative aspects, the second latency may be less than the first latency.

In some demonstrative aspects, the second link configuration may support a relatively low latency, e.g., a latency, which may support quick detection of the voice command.

In some demonstrative aspects, the second link configuration may support latency of less than 25 msec. In one example, the second link configuration may support latency of less than 15 msec. In another example, the second link configuration may support latency of less than 10 msec. In another example, the second link configuration may support latency between 8 msec and 10 msec. In other aspects, any other latency may be implemented.

In some demonstrative aspects, device 102 and/or device 140 may be configured to utilize the second link configuration of the BT wireless communication link, for example, by configuring the BT wireless communication link as a synchronous link, e.g., a BT Synchronous link, for communication with BT device 140 during the voice command detection mode. In other aspects, any other link configuration may be used.

In some demonstrative aspects, controller 124 may be configured to cause, trigger, and/or control BT audio device 102 to perform a BT Connection Update operation, for example, based on detection of the user passphrase, to switch from the isochronous configuration of the BT wireless communication link to the synchronous configuration of the BT wireless communication link, e.g., to support the low latency during the voice command detection mode.

In some demonstrative aspects, controller 124 may be configured to cause, trigger, and/or control BT audio device 102 to reconfigure the BT wireless communication link, for example, back to the first link configuration or to any other link configuration, for example, based on one or more criteria.

In some demonstrative aspects, controller 124 may be configured to cause, trigger, and/or control BT audio device 102 to reconfigure the BT wireless communication link, for example, based on detection of noise over then BT wireless link, for example, after detection of the voice command.

In some demonstrative aspects, the selective switching of the BT link configuration, e.g., between the first and second link configurations, may provide a technical solution to save power at devices 102 and/or 140.

In some demonstrative aspects, there may be some use cases, implementations, and/or scenarios, in which reconfiguration of the BT link may not be supported and/or implemented efficiently. In one example, some BT devices, e.g., legacy BT devices, may not support LE Audio functionality.

In some demonstrative aspects, device 102 and/or device 140 may be configured to offload support of detection of the user passphrase, for example, to a SNIFF link between BT audio device 120 and BT device 140.

In some demonstrative aspects, device 102 and/or device 140 may be configured to establish a BT synchronous link, e.g., a BT Synchronous Connection Oriented (SCO) link, for example, based on the detection of the user passphrase. For example, deferring the establishment of the BT synchronous link, for example, until after the user passphrase is detected, may provide a technical solution to save power, e.g., at device 102 and/or device 140.

In some demonstrative aspects, controller 124 may be configured to cause, trigger, and/or control BT audio device 102 to switch back to the SNIFF mode, for example, by disconnecting the BT synchronous link. For example, controller 124 may be configured to cause, trigger, and/or control BT audio device 102 to switch back to the SNIFF mode based on detection of noise over then BT wireless link, for example, after detection of the voice command.

In some demonstrative aspects, controller 124 may be configured to cause, trigger, and/or control BT audio device 102 to monitor audio input 165 of the BT audio device 102, for example, to detect whether the audio input 165 includes a voice signal, e.g., during the passphrase-detection mode.

In some demonstrative aspects, controller 124 may be configured to cause, trigger, and/or control BT audio device 102 to transmit one or more null-data packets (NDPs) to BT device 140 over a BT wireless communication link between the BT audio device 102 and the BT device 140, for example, based on a determination that the audio input 165 does not include the voice signal.

In some demonstrative aspects, controller 124 may be configured to cause, trigger, and/or control BT audio device 102 to transmit one or more data packets to the BT device 140 over the BT wireless communication link, for example, based on a determination that the audio input c165 includes the voice signal.

In some demonstrative aspects, a payload of the one or more data packets may include audio data based on the audio input 165.

In some demonstrative aspects, BT audio device 102 may include an audio processor 166, which may be configured to process the audio input 165 to detect whether the audio input 165 includes the voice signal.

In some demonstrative aspects, controller 124 may include, may be implemented as part of, and/or may perform one or more functionalities of a BT controller to control communications of BT audio device. For example, controller 124 may be configured to set up and/or configure the BT wireless communication link between BT audio device 102 and BT device 140, and/or to configure and/or control BT communications performed by BT audio device 102 over the BT wireless communication link.

In some demonstrative aspects, controller 124 may be configured to cause, trigger, and/or control BT audio device 102 to transmit the null-data packets and the data packets over the BT wireless communication link, for example, based on an input from audio processor 166 to indicate whether the audio input 165 includes the voice signal.

In some demonstrative aspects, controller 124 may be configured to cause, trigger, and/or control BT audio device 102 to repeat transmission of the null-data packets over the BT wireless communication link with BT device 140, for example, as long as the audio input 165 determined not to include any voice signal.

In other aspects, controller 124 may be configured to cause, trigger, and/or control BT audio device 102 to repeat transmission of the null-data packets over the BT wireless communication link with BT device 140 based on any other additional or alternative criteria.

In some demonstrative aspects, controller 124 may be configured to cause, trigger, and/or control BT audio device 102 to repeat transmission of the null-data packets over the BT wireless communication link with BT device 140, for example, at an interval, e.g., a keep-alive interval, configured to maintain the BT wireless communication link active.

In some demonstrative aspects, controller 124 may be configured to cause, trigger, and/or control BT audio device 102 to continue transmission of the data packets over the BT wireless communication link with BT device 140, for example, as long as the audio input 165 is determined to include the voice signal.

In other aspects, controller 124 may be configured to cause, trigger, and/or control BT audio device 102 to repeat transmission of the data packets over the BT wireless communication link with BT device 140 based on any other additional or alternative criteria.

In some demonstrative aspects, controller 124 may be configured to cause, trigger, and/or control BT audio device 102 to transmit the null-data packets over the BT wireless communication link with BT device 140 according to a first BT link configuration supporting a first communication latency, for example, based on the determination that the audio input 165 does not include the voice signal.

In some demonstrative aspects, controller 124 may be configured to cause, trigger, and/or control BT audio device 102 to reconfigure the BT wireless communication link with BT device 140 according to a second BT link configuration supporting a second communication latency, for example, based on the determination that the audio input 165 includes the voice signal.

In some demonstrative aspects, controller 124 may be configured to cause, trigger, and/or control BT audio device 102 to transmit the data packets over the BT wireless communication link according to the second BT link configuration, for example, based on the determination that the audio input 165 includes the voice signal.

In some demonstrative aspects, the second communication latency may be lower than the first communication latency.

In some demonstrative aspects, the first communication latency may be between 50 msec and 100 msec.

In some demonstrative aspects, the second communication latency may be no more than 10 msec.

In other aspects, the first communication latency and/or the second communication latency may include any other latency values.

In some demonstrative aspects, controller 124 may be configured to cause, trigger, and/or control BT audio device 102 to transmit the null-data packets over the BT wireless communication link with BT device 140 according to an asynchronous BT link configuration, for example, based on the determination that the audio input 165 does not include the voice signal.

In some demonstrative aspects, controller 124 may be configured to cause, trigger, and/or control BT audio device 102 to reconfigure the BT wireless communication link with BT device 140 according to a synchronous BT link configuration, for example, based on the determination that the audio input 165 includes the voice signal.

In some demonstrative aspects, controller 124 may be configured to cause, trigger, and/or control BT audio device 102 to transmit the data packets over the BT wireless communication link according to the synchronous BT link configuration for example, based on the determination that the audio input 165 includes the voice signal.

In some demonstrative aspects, controller 124 may be configured to cause, trigger, and/or control BT audio device 102 to transmit the null-data packets over the BT wireless communication link with BT device 140 according to a first BT SCO link configuration having a first interval between reserved timeslots, for example, based on the determination that the audio input 165 does not include the voice signal.

In some demonstrative aspects, controller 124 may be configured to cause, trigger, and/or control BT audio device 102 to reconfigure the BT wireless communication link according to a second BT SCO link configuration having a second interval between reserved timeslots, for example, based on the determination that the audio input 165 includes the voice signal.

In some demonstrative aspects, controller 124 may be configured to cause, trigger, and/or control BT audio device 102 to transmit the data packets over the BT wireless communication link according to the second BT SCO link configuration, for example, based on the determination that the audio input 165 includes the voice signal.

In some demonstrative aspects, the first interval between reserved timeslots according to the first BT SCO link configuration may be longer than the second interval between reserved timeslots according to the second BT SCO link configuration.

In some demonstrative aspects, the first interval between reserved timeslots according to the first BT SCO link configuration may be at least 50 ms.

In some demonstrative aspects, the second interval between reserved timeslots according to the second BT SCO link configuration may be no more than 10 ms.

In other aspects, any other BT SCO link configuration with any other interval between reserved timeslots may be implemented.

In some demonstrative aspects, controller 124 may be configured to cause, trigger, and/or control BT audio device 102 to communicate with BT device 140 data packets based on audio input 165 according to a first BT link configuration, e.g., during the passphrase-detection mode.

In some demonstrative aspects, controller 124 may be configured to cause, trigger, and/or control BT audio device 102 to communicate with BT device 140 data packets based on audio input 165 according to a second BT link configuration, e.g., during the voice command detection mode.

In some demonstrative aspects, controller 124 may be configured to cause, trigger, and/or control BT audio device 102 to transmit to BT device 140 one or more first data packets having a payload based on audio input 165 of the BT audio device 102, for example, during the passphrase-detection mode.

In some demonstrative aspects, controller 124 may be configured to cause, trigger, and/or control BT audio device 102 to transmit the one or more first data packets over the BT wireless communication link between BT audio device 102 and BT device 140, for example, according to a first BT link configuration supporting a first communication latency.

In some demonstrative aspects, controller 154 may be configured to cause, trigger, and/or control BT audio device 140 to process the one or more first data packets from BT audio device 102, for example, to detect the user passphrase from the user of BT audio device 102.

In some demonstrative aspects, controller 154 may be configured to cause, trigger, and/or control BT audio device 140 to send a message to BT audio device 102, e.g., over the BT wireless communication link, to indicate detection of the passphrase based on the first data packets.

In some demonstrative aspects, controller 124 may be configured to cause, trigger, and/or control BT audio device 102 to switch from the passphrase-detection mode to the voice-command detection mode, for example, based on receipt of the message from BT device 140 to indicate detection of the pass-phrase based on the first data packets, In some demonstrative aspects, controller 124 may be configured to cause, trigger, and/or control BT audio device 102 to switch from the passphrase-detection mode to the voice-command detection mode, for example, by reconfiguring the BT wireless communication link according to a second BT link configuration.

In some demonstrative aspects, the second BT link configuration may support a second communication latency for communication of one or more second data packets based on the audio input 165 of the BT audio device 102, e.g., during the voice-command detection mode.

In some demonstrative aspects, the second communication latency may be lower than the first communication latency.

In some demonstrative aspects, the first communication latency may be between 50 msec and 100 msec.

In some demonstrative aspects, the second communication latency may be no more than 10 msec.

In other aspects, the first communication latency and/or the second communication latency may include any other latency values.

In some demonstrative aspects, the first BT link configuration may include an asynchronous BT link configuration.

In some demonstrative aspects, the second BT link configuration may include a synchronous BT link configuration.

In some demonstrative aspects, the first BT link configuration may include a first BT SCO link configuration having a first interval between reserved timeslots.

In some demonstrative aspects, the second BT link configuration may include a second BT SCO link configuration having a second interval between reserved timeslots.

In some demonstrative aspects, the first interval between reserved timeslots may be longer than the second interval between reserved timeslots.

In some demonstrative aspects, the first interval between reserved timeslots may be at least 50 msec.

In some demonstrative aspects, the second interval between reserved timeslots may be no more than 10 ms.

In other embodiments, the first BT link configuration and/or the second BT link configuration may include configuration of any other BT link according to any other additional or alternative parameter.

In some demonstrative aspects, BT audio device 102 and/or BT device 140 may configure the BT wireless communication link between BT audio device 102 and BT device 140 as a SNIFF link, for example, with a latency in order of 100 s of milliseconds, or any other latency. In one example, this latency may be acceptable, in some use cases, for example, as the user passphrase may be treated as non real-time data and, accordingly, some level of latency for detecting the passphrase may be acceptable.

In some demonstrative aspects, BT audio device 102 and/or BT device 140 may setup a BT synchronous link between BT audio device 102 and/or BT device 140, for example, based on detection of the user passphrase. In one example, the setup of the BT synchronous link may be triggered and/or controlled by controller 154 and/or controller 124, for example, based on detection of the user passphrase.

In some demonstrative aspects, controller 124 may be configured to monitor the audio input 165, for example, to detect silence and/or white noise for a period of time, e.g., a preconfigured or predefined period of time.

In some demonstrative aspects, controller 124 may be configured to cause, trigger, and/or control BT audio device 102 to switch back to the SNIFF mode, for example, based on detection of the silence and/or white noise in audio input 165 for the period of time.

In some demonstrative aspects, controller 124 may be configured to cause, trigger, and/or control BT audio device 102 to switch back to the SNIFF mode, for example, by disconnecting the SCO link.

In some demonstrative aspects, monitoring the audio input 165 to detect silence and/or white noise may provide a technical solution to save power at devices 102 and/or 140.

Figure 3:
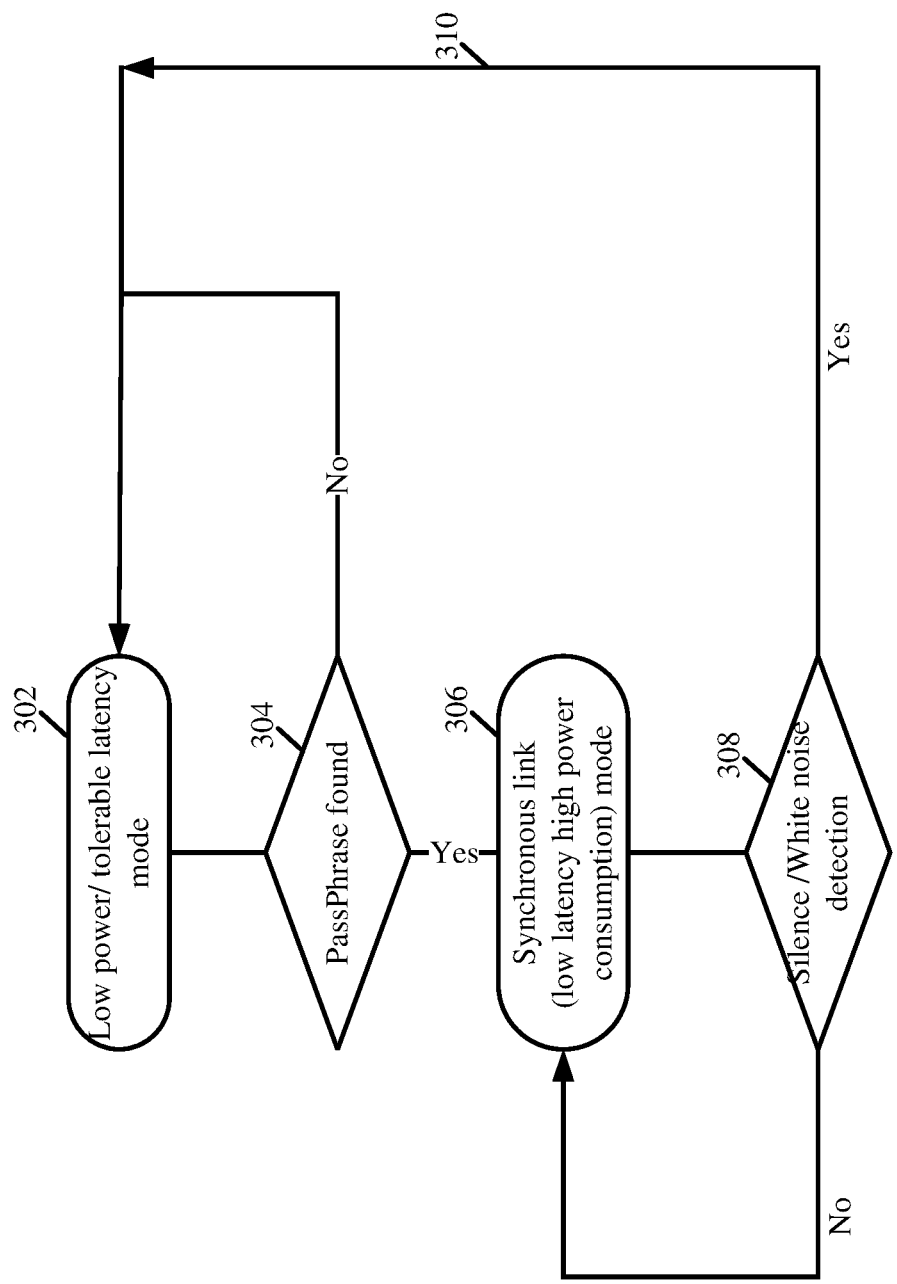
FIG. 3 is a schematic flow-chart illustration of a method of switching between first and second Bluetooth (BT) link configurations of a BT wireless communication link to support a voice command functionality, in accordance with some demonstrative aspects.

FIG. 3 is a schematic flow-chart illustration of a method of switching between first and second BT link configurations of a BT wireless communication link to support a voice command functionality, in accordance with some demonstrative aspects. For example, one or more operations of the method of FIG. 3 may be performed by a BT audio device, e.g., BT audio device 102 (FIG. 1), a BT device, e.g., BT device 140 (FIG. 1), and/or a controller, e.g., controller 124 (FIG. 1) and/or controller 154 (FIG. 1).

As indicated at block 302, the method may include configuring the BT wireless communication link according to a first BT configuration mode for communication of data packets based on an audio input of a BT audio device, e.g., during a passphrase detection mode. For example, the first BT configuration mode may have a low power consumption and/or a relatively high, yet tolerable, latency. For example, BT audio device 102 (FIG. 1) and/or BT device 140 (FIG. 1) may configure the BT wireless communication link between BT audio device 102 (FIG. 1) and BT device 140 (FIG. 1) according to the first BT configuration mode, for example, to support communications during the passphrase detection mode, e.g., as described above.

As indicated at block 304, the method may include attempting to detect the user passphrase. For example, BT audio device 102 (FIG. 1) may transmit to BT device 140 (FIG. 1) one or more data packets with a payload based on the audio input 165 (FIG. 1), and BT device 140 (FIG. 1) may process the data packets to detect the user passphrase.

As indicated at block 306, the method may include configuring the BT wireless communication link according to a second BT configuration mode, e.g., based on a determination that the user passphrase is detected. For example, the second BT configuration mode may have a high power consumption, e.g., compared to the power consumption of the first BT configuration mode; and/or a relatively low latency, e.g., compared to the latency of the first BT configuration mode. In one example, the second BT configuration mode may include a BT synchronous mode. For example, BT audio device 102 (FIG. 1) and/or BT device 140 (FIG. 1) may configure the BT wireless communication link between BT audio device 102 (FIG. 1) and BT device 140 (FIG. 1) according to the second BT configuration mode, for example, to support communications during the voice command detection mode, e.g., as described above.

As indicated at block 308, the method may include monitoring the audio input of the BT audio device to detect silence and/or white noise. For example, BT audio device 102 (FIG. 1) may monitor the audio input 165 (FIG. 1) to detect silence and/or white noise, for example, after switching to the voice command detection mode, e.g., as described above.

As indicated by arrow 310, the method may include switching back to the first BT configuration mode of the BT wireless communication link, for example, based on detection of the silence and/or white noise in the audio input of the BT audio device. For example, BT audio device 102 (FIG. 1) and/or BT device 140 (FIG. 1) may reconfigure the BT wireless communication link between BT audio device 102 (FIG. 1) and BT device 140 (FIG. 1) according to the first BT configuration mode, for example, based on detection of the silence and/or white noise in audio input 165 (FIG. 1), e.g., as described above.

Figure 4:
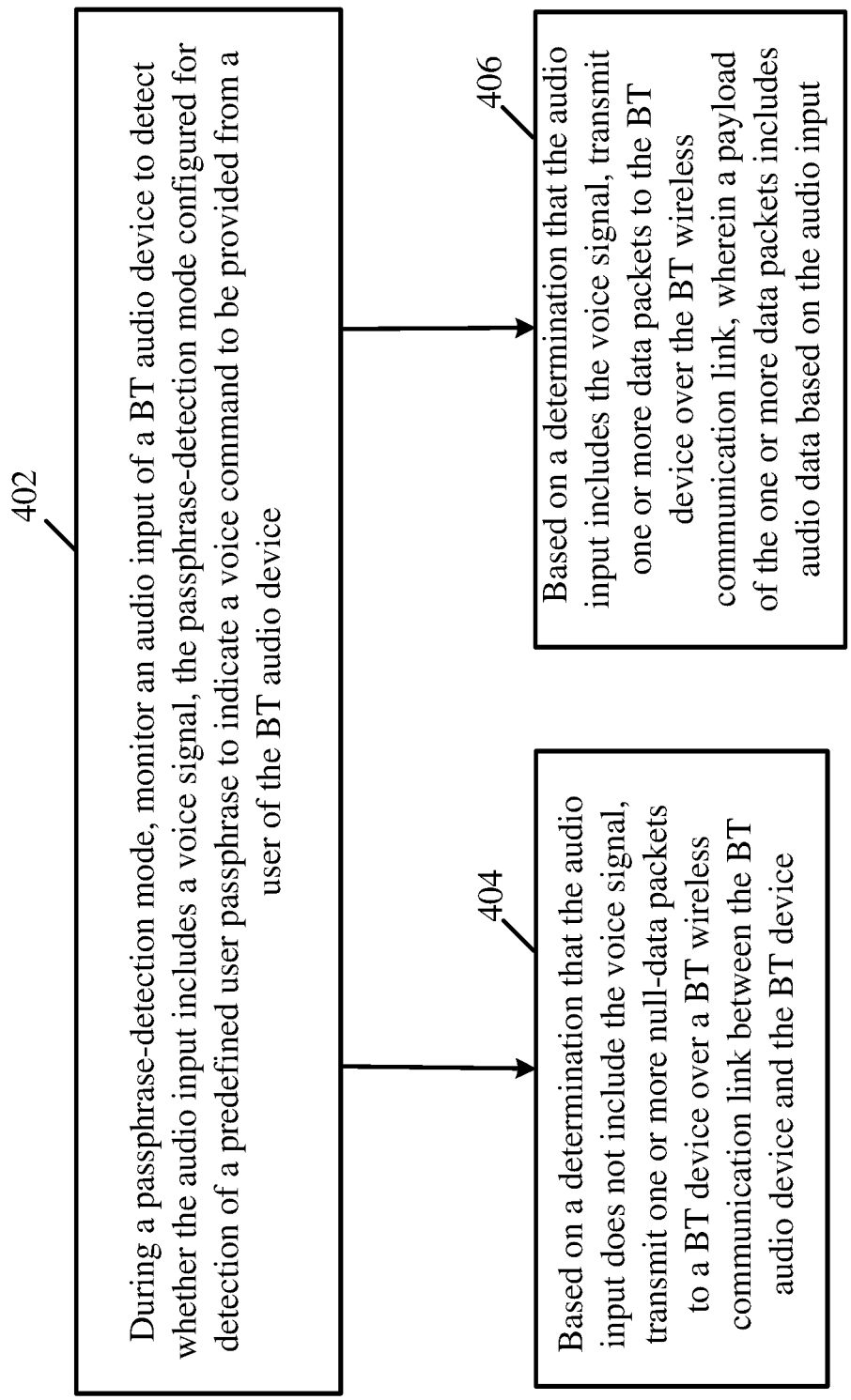
FIG. 4 is a schematic flow-chart illustration of a method of communicating audio traffic over a BT link, in accordance with some demonstrative aspects.

Reference is made to FIG. 4, which schematically illustrates a method of communicating audio traffic over a BT link, in accordance with some demonstrative aspects. For example, one or more of the operations of the method of FIG. 4 may be performed by one or more elements of a system, e.g., system 100 (FIG. 1), for example, may be performed by a BT audio device, e.g., BT audio device 102 (FIG. 1), a BT device, e.g., BT device 140 (FIG. 1), and/or a controller, e.g., controller 124 (FIG. 1) and/or controller 154 (FIG. 1).

As indicated at block 402, the method may include monitoring an audio input of a BT audio device to detect whether the audio input includes a voice signal, for example, during a passphrase-detection mode configured for detection of a predefined user passphrase to indicate a voice command to be provided from a user of the BT audio device. For example, controller 124 (FIG. 1) may be configured to control, cause, trigger and/or instruct device 102 (FIG. 1) to monitor audio input 165 (FIG. 1) to detect whether the audio input 165 (FIG. 1) includes a voice signal, for example, during a passphrase-detection mode, e.g., as described above.

As indicated at block 404, the method may include transmitting one or more null-data packets to a BT device over a BT wireless communication link between the BT audio device and the BT device, for example, based on a determination that the audio input does not include the voice signal. For example, controller 124 (FIG. 1) may be configured to control, cause, trigger and/or instruct device 102 (FIG. 1) to transmit one or more null-data packets to BT device (FIG. 1) over the BT wireless communication link between BT audio device 102 (FIG. 1) and BT device 140 (FIG. 1), for example, based on a determination that the audio input 165 (FIG. 1) does not include the voice signal, e.g., as described above.

As indicated at block 406, the method may include transmitting to the BT device over the BT wireless communication link one or more data packets with a payload including audio data based on the audio input, for example, based on a determination that the audio input includes the voice signal. For example, controller 124 (FIG. 1) may be configured to control, cause, trigger and/or instruct device 102 (FIG. 1) to transmit to BT device 140 (FIG. 1) one or more data packets with a payload including audio data based on the audio input 165 (FIG. 1), for example, based on a determination that the audio input 165 (FIG. 1) includes the voice signal, e.g., as described above.

Figure 5:
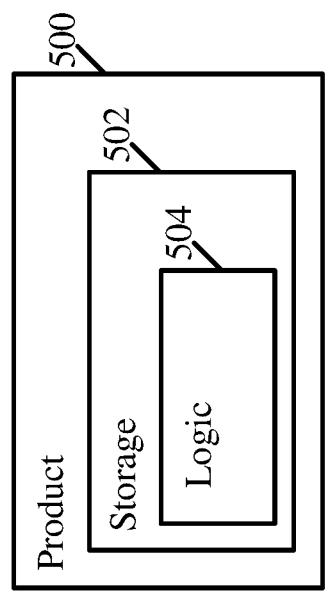
FIG. 5 is a schematic illustration of a product of manufacture, in accordance with some demonstrative aspects.

Reference is made to FIG. 5, which schematically illustrates a product of manufacture 500, in accordance with some demonstrative aspects. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at device 102 (FIG. 1), device 140 (FIG. 1), BT radio 114 (FIG. 1), BT radio 144 (FIG. 1), controller 124 (FIG. 1), controller 154 (FIG. 1), receiver 116 (FIG. 1), transmitter 118 (FIG. 1), message processor 128 (FIG. 1), receiver 146 (FIG. 1), transmitter 158 (FIG. 1), and/or message processor 158 (FIG. 1), to cause device 102 (FIG. 1), device 140 (FIG. 1), BT radio 114 (FIG. 1), BT radio 144 (FIG. 1), controller 124 (FIG. 1), controller 154 (FIG. 1), receiver 116 (FIG. 1), transmitter 118 (FIG. 1), message processor 128 (FIG. 1), receiver 146 (FIG. 1), transmitter 158 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 500 and/or machine-readable storage media 502 may include one or more types of computer-readable storage media capable of storing data, including volatile memory, non-volatile memory, removable or non-removable memory, erasable or non-erasable memory, writeable or re-writeable memory, and the like. For example, machine-readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE- PROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause a Bluetooth (BT) audio device to during a passphrase-detection mode, monitor an audio input of the BT audio device to detect whether the audio input includes a voice signal, the passphrase-detection mode configured for detection of a predefined user passphrase to indicate a voice command to be provided from a user of the BT audio device; based on a determination that the audio input does not comprise the voice signal, transmit one or more null-data packets to a BT device over a BT wireless communication link between the BT audio device and the BT device; and based on a determination that the audio input comprises the voice signal, transmit one or more data packets to the BT device over the BT wireless communication link, wherein a payload of the one or more data packets comprises audio data based on the audio input.

Example 2 includes the subject matter of Example 1, and optionally, wherein the apparatus is configured to cause the BT audio device to repeat transmission of the null-data packets over the BT wireless communication link as long as the audio input is determined not to comprise any voice signal.

Example 3 includes the subject matter of Example 1 or 2, and optionally, wherein the apparatus is configured to cause the BT audio device to repeat transmission of the null-data packets over the BT wireless communication link at an interval configured to maintain the BT wireless communication link active.

Example 4 includes the subject matter of any one of Examples 1-3, and optionally, wherein the apparatus is configured to cause the BT audio device to continue transmission of the data packets over the BT wireless communication link as long as the audio input is determined to comprise the voice signal.

Example 5 includes the subject matter of any one of Examples 1-4, and optionally, wherein the apparatus is configured to cause the BT audio device to, based on the determination that the audio input does not comprise the voice signal, transmit the null-data packets over the BT wireless communication link according to a first BT link configuration supporting a first communication latency; and based on the determination that the audio input comprises the voice signal, reconfigure the BT wireless communication link according to a second BT link configuration supporting a second communication latency, and transmit the data packets over the BT wireless communication link according to the second BT link configuration, wherein the second communication latency is lower than the first communication latency.

Example 6 includes the subject matter of Example 5, and optionally, wherein the first communication latency is between 50 milliseconds and 100 milliseconds.

Example 7 includes the subject matter of Example 5 or 6, and optionally, wherein the second communication latency is no more than 10 milliseconds.

Example 8 includes the subject matter of any one of Examples 1-7, and optionally, wherein the apparatus is configured to cause the BT audio device to:

based on the determination that the audio input does not comprise the voice signal, transmit the null-data packets over the BT wireless communication link according to an asynchronous BT link configuration; and based on the determination that the audio input comprises the voice signal, reconfigure the BT wireless communication link according to a synchronous BT link configuration, and transmit the data packets over the BT wireless communication link according to the synchronous BT link configuration.

Example 9 includes the subject matter of any one of Examples 1-7, and optionally, wherein the apparatus is configured to cause the BT audio device to:

based on the determination that the audio input does not comprise the voice signal, transmit the null-data packets over the BT wireless communication link according to a first BT Synchronous Connection-Oriented (SCO) link configuration having a first interval between reserved timeslots; and based on the determination that the audio input comprises the voice signal, reconfigure the BT wireless communication link according to a second BT SCO link configuration having a second interval between reserved timeslots, and transmit the data packets over the BT wireless communication link according to the second BT SCO link configuration, wherein the first interval between reserved timeslots is longer than the second interval between reserved timeslots.

Example 10 includes the subject matter of Example 9, and optionally, wherein the first interval between reserved timeslots is at least 50 milliseconds (ms), and the second interval between reserved timeslots is no more than 10 ms.

Example 11 includes the subject matter of any one of Examples 1-10, and optionally, comprising an audio processor configured to process the audio input to detect whether the audio input includes the voice signal, and a BT controller to cause the BT audio device to transmit the null-data packets and the data packets over the BT wireless communication link.

Example 12 includes the subject matter of any one of Examples 1-11, and optionally, comprising a BT radio to transmit the null-data packets and the data packets over the BT wireless communication link.

Example 13 includes the subject matter of Example 12, and optionally, comprising one or more antennas connected to the radio, and a processor to execute instructions of an operating system of the BT audio device.

Example 14 includes an apparatus comprising logic and circuitry configured to cause a Bluetooth (BT) audio device to, during a passphrase-detection mode, transmit one or more first data packets to a BT device over a BT wireless communication link between the BT audio device and the BT device according to a first BT link configuration supporting a first communication latency, wherein a payload of the one or more first data packets is based on an audio input of the BT audio device during the passphrase-detection mode; and based on receipt of a message from the BT device to indicate detection of the pass-phrase based on the first data packets, switch from the passphrase-detection mode to a voice-command detection mode by reconfiguring the BT wireless communication link according to a second BT link configuration supporting a second communication latency for communication of one or more second data packets, wherein the second communication latency is lower than the first communication latency, wherein a payload of the one or more second data packets is based on the audio input of the BT audio device during the voice-command detection mode.

Example 15 includes the subject matter of Example 14, and optionally, wherein the first BT link configuration comprises an asynchronous BT link configuration, and the second BT link configuration comprises a synchronous BT link configuration.

Example 16 includes the subject matter of Example 14, and optionally, wherein the first BT link configuration comprises a first BT Synchronous Connection-Oriented (SCO) link configuration having a first interval between reserved timeslots, and the second BT link configuration comprises a second BT SCO link configuration having a second interval between reserved timeslots, wherein the first interval between reserved timeslots is longer than the second interval between reserved timeslots.

Example 17 includes the subject matter of Example 16, and optionally, wherein the first interval between reserved timeslots is at least 50 milliseconds (ms), and the second interval between reserved timeslots is no more than 10 ms.

Example 18 includes the subject matter of any one of Examples 14-17, and optionally, comprising a BT radio to transmit the first and second data packets over the BT wireless communication link.

Example 19 includes the subject matter of Example 18, and optionally, comprising one or more antennas connected to the radio, and a processor to execute instructions of an operating system of the BT audio device.

Example 20 comprises an apparatus comprising means for executing any of the described operations of Examples 1-19.

Example 21 comprises a product comprising one or more tangible computer-readable non-transitory storage media comprising computer-executable instructions operable to, when executed by at least one processor, enable the at least one processor to cause a computing device to perform any of the described operations of Examples 1-19.

Example 22 comprises an apparatus comprising: a memory interface; and processing circuitry configured to: perform any of the described operations of Examples 1-19.

Example 23 comprises a method comprising any of the described operations of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a Bluetooth (BT) audio device to:
    during a passphrase-detection mode, monitor an audio input of the BT audio device to detect whether the audio input includes a voice signal, the passphrase-detection mode configured for detection of a predefined user passphrase to indicate a voice command to be provided from a user of the BT audio device;
    based on a determination that the audio input does not comprise the voice signal, transmit one or more null-data packets to a BT device over a BT wireless communication link between the BT audio device and the BT device;
    based on a determination that the audio input comprises the voice signal, transmit one or more data packets to the BT device over the BT wireless communication link according to a first BT link configuration supporting a first communication latency, wherein a payload of the one or more data packets comprises audio data based on the audio input; and
    based on receipt of a message from the BT device to indicate detection of the predefined user passphrase, reconfigure the BT wireless communication link according to a second BT link configuration for communication of one or more other data packets during a voice-command detection mode, wherein the second BT link configuration is to support a second communication latency lower than the first communication latency.

2. The apparatus of claim 1 configured to cause the BT audio device to repeat transmission of the null-data packets over the BT wireless communication link as long as the audio input is determined not to comprise any voice signal.

3. The apparatus of claim 1 configured to cause the BT audio device to repeat transmission of the null-data packets over the BT wireless communication link at an interval configured to maintain the BT wireless communication link active.

4. The apparatus of claim 1 configured to cause the BT audio device to continue transmission of the data packets over the BT wireless communication link as long as the audio input is determined to comprise the voice signal.

5. The apparatus of claim 1 configured to cause the BT audio device to:
    based on the determination that the audio input does not comprise the voice signal, transmit the null-data packets over the BT wireless communication link according to a third BT link configuration supporting a third communication latency; and based on the determination that the audio input comprises the voice signal, reconfigure the BT wireless communication link according to the first BT link configuration supporting the first communication latency, and transmit the data packets over the BT wireless communication link according to the first BT link configuration, wherein the first communication latency is lower than the third communication latency.

6. The apparatus of claim 5, wherein the third communication latency is between 50 milliseconds and 100 milliseconds.

7. The apparatus of claim 5, wherein the first communication latency is no more than 10 milliseconds.

8. The apparatus of claim 1 configured to cause the BT audio device to:
based on the determination that the audio input does not comprise the voice signal, transmit the null-data packets over the BT wireless communication link according to an asynchronous BT link configuration; and
based on the determination that the audio input comprises the voice signal, reconfigure the BT wireless communication link according to a synchronous BT link configuration, and transmit the data packets over the BT wireless communication link according to the synchronous BT link configuration.

9. The apparatus of claim 1 configured to cause the BT audio device to:
based on the determination that the audio input does not comprise the voice signal, transmit the null-data packets over the BT wireless communication link according to a first BT Synchronous Connection-Oriented (SCO) link configuration having a first interval between reserved timeslots; and
based on the determination that the audio input comprises the voice signal, reconfigure the BT wireless communication link according to a second BT SCO link configuration having a second interval between reserved timeslots, and transmit the data packets over the BT wireless communication link according to the second BT SCO link configuration, wherein the first interval between reserved timeslots is longer than the second interval between reserved timeslots.

10. The apparatus of claim 9, wherein the first interval between reserved timeslots is at least 50 milliseconds (ms), and the second interval between reserved timeslots is no more than 10 ms.

11. The apparatus of claim 1 comprising an audio processor configured to process the audio input to detect whether the audio input includes the voice signal, and a BT controller to cause the BT audio device to transmit the null-data packets and the data packets over the BT wireless communication link.

12. The apparatus of claim 1 comprising a BT radio to transmit the null-data packets and the data packets over the BT wireless communication link.

13. The apparatus of claim 12 comprising one or more antennas connected to the radio, and a processor to execute instructions of an operating system of the BT audio device.

14. A product comprising one or more tangible computer-readable non-transitory storage media comprising computer-executable instructions operable to, when executed by at least one processor, enable the at least one processor to cause a Bluetooth (BT) audio device to:
during a passphrase-detection mode, monitor an audio input of the BT audio device to detect whether the audio input includes a voice signal, the passphrase-detection mode configured for detection of a predefined user passphrase to indicate a voice command to be provided from a user of the BT audio device;
based on a determination that the audio input does not comprise the voice signal, transmit one or more null-data packets to a BT device over a BT wireless communication link between the BT audio device and the BT device;
based on a determination that the audio input comprises the voice signal, transmit one or more data packets to the BT device over the BT wireless communication link according to a first BT link configuration supporting a first communication latency, wherein a payload of the one or more data packets comprises audio data based on the audio input; and
based on receipt of a message from the BT device to indicate detection of the predefined user passphrase, reconfigure the BT wireless communication link according to a second BT link configuration for communication of one or more other data packets during a voice-command detection mode, wherein the second BT link configuration is to support a second communication latency lower than the first communication latency.

15. The product of claim 14, wherein the instructions, when executed, cause the BT audio device to repeat transmission of the null-data packets over the BT wireless communication link as long as the audio input is determined not to comprise any voice signal.

16. The product of claim 14, wherein the instructions, when executed, cause the BT audio device to:
based on the determination that the audio input does not comprise the voice signal, transmit the null-data packets over the BT wireless communication link according to a third BT link configuration supporting a third communication latency; and
based on the determination that the audio input comprises the voice signal, reconfigure the BT wireless communication link according to the first BT link configuration supporting the first communication latency, and transmit the data packets over the BT wireless communication link according to the first BT link configuration, wherein the first communication latency is lower than the third communication latency.

17. The product of claim 14, wherein the instructions, when executed, cause the BT audio device to:
based on the determination that the audio input does not comprise the voice signal, transmit the null-data packets over the BT wireless communication link according to an asynchronous BT link configuration; and
based on the determination that the audio input comprises the voice signal, reconfigure the BT wireless communication link according to a synchronous BT link configuration, and transmit the data packets over the BT wireless communication link according to the synchronous BT link configuration.

* * * * *